United States Patent [19]

De Filippis

[11] Patent Number: 4,742,226

[45] Date of Patent: May 3, 1988

[54] RADIONUCLIDE IDENTIFICATION IN LIQUID SCINTILLATION COUNTING

[75] Inventor: Stanley J. De Filippis, Naperville, Ill.

[73] Assignee: Packard Instrument Company, Inc., Downers Grove, Ill.

[21] Appl. No.: 775,880

[22] Filed: Sep. 13, 1985

[51] Int. Cl.$^4$ .............................................. G01T 1/204
[52] U.S. Cl. .................................. 250/328; 250/362; 250/364
[58] Field of Search .................. 250/328, 362, 364

[56] References Cited

U.S. PATENT DOCUMENTS 3,780,289 12/1973 Kluberg et al. ................ 250/362
4,628,205 12/1986 Van Cauter et al. ............ 250/328

OTHER PUBLICATIONS

McQuarrie et al., "Some Performance Characteristics of Modern Liquid Scintillation Counters", International Journal of Applied Radiation and Isotopes, vol. 34, No. 7, (Jul. 1983), pp. 1009–1012.
Grower et al., "Handling Liquid Scintillation Counting Data with Small Desk-Top Computers", Analytical Biochemistry, vol. 31 (1969), pp. 159–173.
Dugan et al., "Beta Emitter Identification by Quench Analysis", Organic Scintillators and Liquid Scintillation Counting (1971), pp. 1055–1062.
Everett, et al., "The Application of Spectral Analysis in Liquid Scintillation Counting", Liquid Scintillation Counting Recent Applications and Development (1980), vol. 1, pp. 119–128.

*Primary Examiner*—Carolyn E. Fields
*Attorney, Agent, or Firm*—Stephen G. Rudisill

[57] ABSTRACT

Apparatus and a method useful for identifying and verifying which radionuclide is present in a test sample for use in a liquid scintillation counter is disclosed. The invention is directed to measuring a quench-indicating parameter of the sample and an external source quench-indicating parameter. The measured values are compared to known radionuclide equations to determine if an identifying fit exists. If the measured values are determined to satisfy, one of the known radionuclide equations, then the identity of a radionuclide is established. In a multilabel sample the measured values may be used to identify the radionuclide having the highest end point maximum energy.

10 Claims, 3 Drawing Sheets

RADIONUCLIDE IDENTIFICATION IN LIQUID SCINTILLATION COUNTING

FIELD OF THE INVENTION

The invention relates to apparatus and a method useful for identifying and verifying which radionuclide is present in a test sample used in a liquid scintillation counter. More specifically, the present invention is directed to measuring a quench-indicating parameter of the sample and an external source quench-indicating parameter. The measured values are compared to radionuclide equations to determine if an identifying fit exists.

BACKGROUND OF THE INVENTION

Liquid scintillation counting is a generally known and widely used technique for the measurement of low energy beta emitting radionuclides in addition to gamma and alpha emitters. The liquid scintillation counter is utilized to make quantitative measurements of radioactivity when incorporating a radio-labeled analyte into solution with a liquid medium capable of producing photons resulting from the kinetic interactions of nuclear decay products. There are different radionuclides, both man-made and naturally occurring, which can be experimentally employed to illustrate the molecular dynamics of a particular model by measuring their distributions in various systems. It is often desirable to use multiple radionuclides in the same experiment to follow different distributions in the same system simultaneously.

The energy of the beta particles ranges from zero energy to the characteristic end point maximum energy for that radionuclide. A pulse height energy distribution spectrum may be recorded for the solution being analyzed. When the solution being analyzed contains a mixture of beta emitters there is an overlap of the spectra from each emitter. The area under a pulse height energy distribution spectrum increases as decay events are accumulated over a period of time corresponding to the energy of the decay event. The total area of this spectrum may be correlated to the Spectral Index of the Sample (SIS) or alternatively the measured end point maximum energy.

Specific radionuclides have developed immense importance in various applications wherein radio-labeled components are utilized. By dissolving a sample containing the radionuclide in a mixture with a typical liquid scintillation cocktail, such as an aromatic solvent containing an organic scintillator, energy from the nuclear decay is transferred with reasonable efficiency to the scintillators which emit multiple photons proportional to energy of the beta particle. The light is detected by sensitive photomultiplier tubes. In a normal state these photomultiplier tubes have a characteristic dark noise which occurs upon the spontaneous emission of an electron within the tube. The dark noise consists of pulses generating a low intensity photon response. Thus, by utilizing multiple photomultiplier tubes and by requiring a coincidental event, beta emitters can be measured while minimizing the background. The higher the energy of the beta particle, the more photons will be produced over selected time intervals such as 20–50 nanoseconds. All photons produced within that interval are considered a pulse. The combined amplitude of the photons is known as the pulse height. The range of pulse heights is a smooth distribution of energies ranging from zero energy rising to a maximum and tailing off to the maximum energy characteristic of the beta emitting radionuclide. This distribution is known as the pulse-height energy distribution spectrum.

Another phenomenon of interest to a liquid scintillation user is the phenomenon of quenching. All energy created by the beta particle in reaction with the fluor is unfortunately not dissipated into the production of light. The adding of sample material to the scintillation solution introduces molecules which absorb energy and which may not be capable of producing light. A portion of the energy of the ejected decayed particles is dissipated in the excitation of solvent molecules as well as by the indirect transfer of energy to obstructive sample molecules otherwise not capable of energy transfer or the conversion of that energy into photons. Since some of the energy transferred to sample molecules is not utilized to produce photons, it is not measured by the photomultiplier tubes and not recorded. Quenching results in the spectrum of pulse amplitudes having an apparent diminished energy when compared to the theoretical spectrum for an unquenched sample.

The relative quenching of the sample may be determined by using an external source quench-indicating parameter (QIP) such as the Spectral Index of the External Standard (SIE). This method involves counting the sample with a gamma radiation source adjacent the vial and subsequently in the absence of the gamma radiation source such that the contribution of only the gamma radiation source is studied. The gamma radiation source generates compton electrons in the sample solution which behave in a similar manner to decaying nuclear particles. If quenching is present the pulse-height energy distribution spectra from the gamma radiation generated events will be compressed towards a lower apparent energy. External standard quench-indicating parameters (QIP) include the external standard ratio (ESR), Spectral Index of the External Standard (SIE); H Number, ESP and the transformed Spectral Index of External Standard (tSIE).

It has been determined that a correlation equation which is essentially a straight line exists for the comparison of an external standard quench-indicating parameter and a quench-indicating parameter of a sample when both are measured at varying degrees of quenching. This equation is of the form of $y = mx + b$. Samples of various radionuclides and the appropriate radionuclide equation for each as determined on a Packard Instrument Company, Inc. Model 2000CA liquid scintillation counter are:

| Tritium | $SIS = 0.015 tSIE + 3.604$ |
|---|---|
| Carbon-14 | $SIS = 0.164 tSIE + 3.359$ |
| Chlorine-36 | $SIS = 1.043 tSIE + 14.969$ |

As may be seen from these radionuclide equations each defines a straight line of a slope m (0.015 for Tritium, 0.164 for Carbon-14 and 1.043 for Chlorine-36) which intercepts the SIS axis of a plot of SIS versus tSIE at the value b (3.609 for Tritium, 3.359 for Carbon-14 and 14.964 for Chlorine-36).

It can be seen that the slope of the equation increases with the molecular mass of the radionuclide which is the equivalent of the slope of the equation increasing with the radionuclide energy maximum end point or with the area under the sample spectrum distribution. This slope varies from almost no slope for Tritium to almost a vertical line for radionuclides with higher energy maximums. Each radionuclide has a distinct radionuclide equation and slope.

Since the radionuclide equation for each radionuclide is different, once a table of radionuclide equations is established, then the appropriate combination of a quench-indicating parameter of the sample such as SIS or the measured end point maximum energy and the external source quench-indicating parameter such as tSIE for a sample can only satisfy one of these equations. Once this equation is identified, the radionuclide is thereby identified. This sample need only be tested at a single quench level to determine if the values satisfy a specific radionuclide equation.

If a sample is tested at different quench levels, then the slope of the radionuclide equation for the sample can be calculated. This sample slope can then be compared only to the slope portion of each radionuclide equation to determine a match. Again, once the slope is identified to be that of a particular radionuclide, the identity of the radionuclide is known.

If no match is obtained between the test sample and the known radionuclide equation, it may be an indication of one or more problems in the test arrangement. If the sample is nonhomogeneous or contains radionuclides not having an equation in the look-up table, then no match should be achieved. Equipment malfunctions and other sample preparation errors could likewise result in identification of a radionuclide not being made.

In the event the sample contains a multiplicity of unknown radionuclides, the measured end point maximum energy for the highest energy emitter of the combinations can be used to identify this radionuclide. The radionuclide equation in this case would be based on the end point maximum energy representing the sample QIP as a function of tSIE for a given radionuclide at different degrees of quenching. For a full explanation of using the end point maximum energy as a quench-indicating parameter see U.S. Pat. No. 4,633,088 entitled "Reverse Sum Quench Measurement Using A Liquid Scintillation Counter".

The herein invention utilizes regionless counting of the disintegrations per minute of the radionuclides. The invention is directed towards determining the Spectral Index of the Sample (SIS) or first moment of the spectrum or mean pulse height or some other quench-indicating parameter (QIP) of the sample. A QIP based on an external standard such as the transformed Spectral Index of the External Standard (tSIE) of the radionuclide in the mixture is then determined for the sample mixture using regionless counting.

An advantage of utilizing regionless counting is that all the spectral information is used to determine the quench-indicating parameters and to make the desired calculations. Overall theoretical uncertainty using the total spectral information is less than theoretical uncertainty using discrete regions.

Additionally, an advantage of this scheme is that standards necessary to develop appropriate radionuclide equations may be done once and the appropriate information stored in a machine as opposed to being done in each instance for each particular radionuclide. Additionally the counting uncertainties associated with the discrete multiple energy region counting are reduced. Theoretically, more accurate measurements can be made than existing techniques since the entire spectral value information is utilized to reach the appropriate conclusion. This technique may be used to automatically identify or verify the radionuclide being tested in each instance. If used automatically the liquid scintillation counter may indicate to the operator the presence of a problem should the wrong radionuclide be identified or should no radionuclide be identified.

SUMMARY OF THE INVENTION

It is an object of the present invention to provide a liquid scintillation counter capable of identifying the radionuclide present in a test sample.

It is a further object of the present invention to provide a liquid scintillation counter capable of identifying the highest energy radionuclide present in a multiple label test sample.

It is another object of the present invention to provide a method of identifying and confirming which radionuclide is present in a single label sample.

It is a still further object of the present invention to provide a liquid scintillation counter wherein the operator can use the liquid scintillation counter to verify the radionuclide being tested and that the test sample contains but one radionuclide.

These and other objects will be apparent from the description to follow and the appended claims.

The above objects are achieved according to a preferred embodiment of the invention by the provision of a liquid scintillation counting system for use with a test sample containing one or more radioactive nuclides together with a liquid scintillator such that the identity of a radionuclide in a sample may be ascertained. Transducer means for converting energy released by the decay of the radionuclides into electrical pulses proportional thereto are provided. Signal processing means are connected to the transducer means for eliminating pulses which do not fall within a predetermined time differential window thereby screening out pulses which are not related to the decay of a radionuclide. Quantizing means are provided for and are connected to the signal processing means for converting each pulse into a representative digital signal. Processing means are connected to receive the digital signals and include storage means for storing radionuclide equations correlating a quench-indicating parameter of the sample and an external source quench-indicating parameter for a series of desired radionuclides and said processing means storing data representative of an external source quench-indicating parameter of the test sample and the pulse height energy distribution spectrum generated by the decay of the radionuclides in the test sample. Said processing means also includes means to determine if the data representation of the external source quench-indicating parameter and the pulse height energy distribution spectrum satisfy any of the stored radionuclide equations thereby indicating the presence of the radionuclide of the appropriate equation.

Additionally disclosed is a regionless method for ascertaining the identity of an unknown radioactive nuclide in a test sample including the steps of establishing a set of radionuclide equations between a quench-indicating parameter of the sample and an external source quench-indicating parameter for each of the desired radionuclides, determining an external source quench-indicating parameter and a quench-indicating parameter for the test sample, comparing the external source quench-indicating parameter and the quench-indicating parameter of the test sample to the equation and identifying the radionuclide in the test sample by identifying which radionuclide equation is satisfied by the external source quench-indicating parameter and the quench-indicating parameter.

DESCRIPTION OF THE PREFERRED EMBODIMENT

Figure 1:
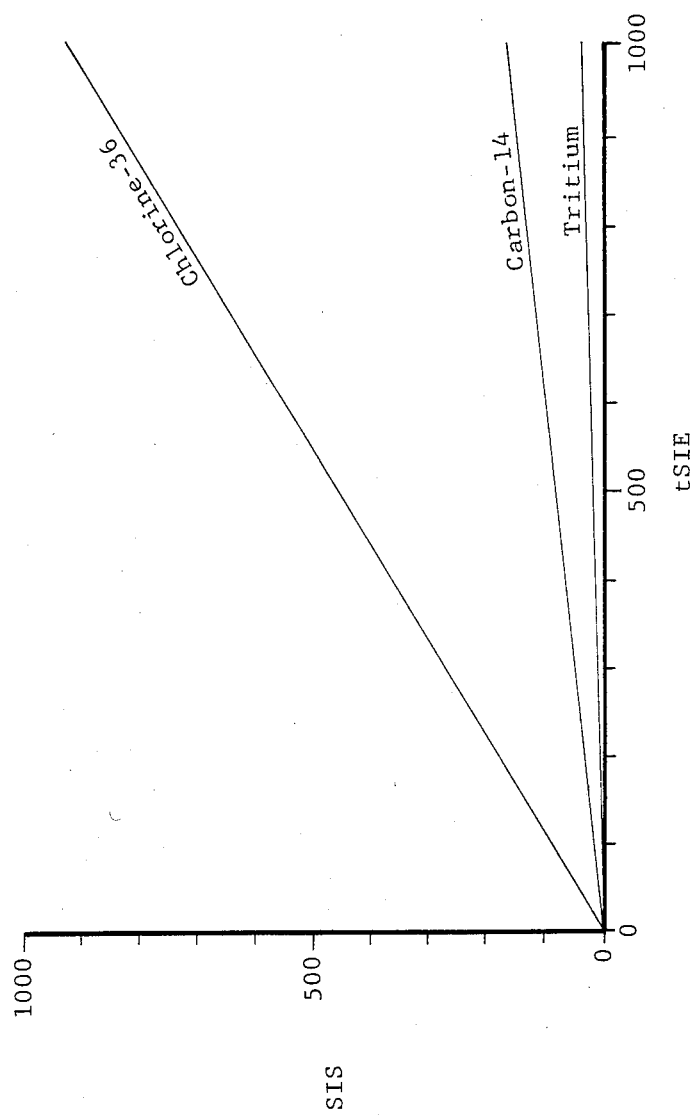
FIG. 1 is a graph of SIS versus tSIE for Tritium, Carbon-14 and Chlorine-36.

Referring first to FIG. 1, there may be seen a graph of the comparison of tSIE versus SIS values for Tritium, Carbon-14 and Chlorine-36. It may be seen that for Tritium, the slope of the plot is 0.015, whereas the slope for Chlorine-36 is 1.043. The slope for Carbon-14 is 0.164. It has been found that the specific radionuclide equation for each separate radionuclide is different.

The transformed Spectral Index of the the External Standard (tSIE) is an index reflecting the degree of quenching of the sample. Optical events are created by the Compton effect when a gamma radiation source is placed next to the sample. Since this gamma radiation source is designed to be of a relatively constant value, the sample may be counted with and without the gamma source present. The difference in the spectra between the two conditions indicates the contribution of the gamma radiation. Since this contribution is known, the degree of quenching may be determined. tSIE is not dependent upon the specific radionuclide present.

The Spectral Index of the Sample or SIS, however, is a measure of the area under the pulse height energy distribution spectrum for the sample being evaluated. The area of the sample is dependent upon the maximum energy or end point at which the radionuclide decays and the accumulation of decay events. For Tritium the energy maximum end point is 18.6 keV., for Carbon-14 it is 156 keV. and Chlorine-36 it is 710 keV. Hence, since no radionuclide has the same end point energy at a similar degree of quench, the area under the spectrum in each instance will be different, and hence the comparison of SIS to tSIE will have a distinct slope for each radionuclide. The herein method and apparatus is directed towards identifying this specific equation or slope of the line for each radionuclide and comparing that to the test data to determine the specific radionuclide present in the test sample.

Figure 3:
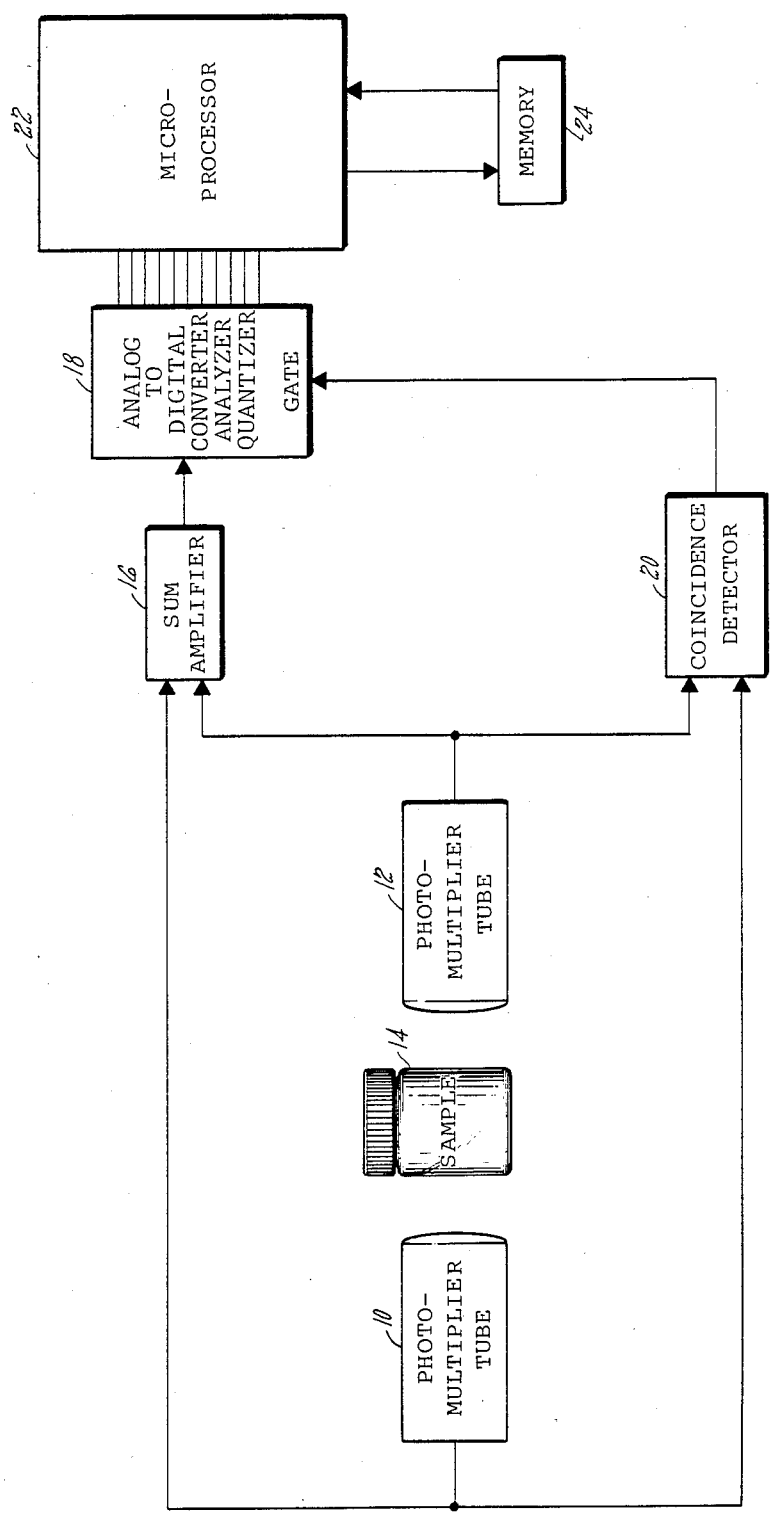
FIG. 3 is a schematic representation of a liquid scintillation counter.

FIG. 3 is a block diagram of a typical electronic liquid scintillation counter. Such a counter could be a Packard Tricarb 2000 Series liquid scintillation counter. It may be seen in FIG. 3 that the system typically includes a first photomultiplier tube 10 and a second photomultiplier tube 12 which are positioned with an overlapping field of view. The material to be assayed is placed in a sample container 14 which, in the counting mode, is loaded into a centrally-disposed position relative to photomultiplier tubes 10 and 12. A summing amplifier 16, connected to the output of each of the photomultiplier tubes, both combines the respective output signals and also increases the amplitude proportionately to the level observed by the photomultiplier tubes. An analyzer, quantizer analog-to-digital converter 18 is connected to the output of the sum amplifier 16 to quantize the signal level and to generate a digital number which identifies the specific magnitude of each received pulse. A coincidence detector 20 is provided to distinguish a scintillation event related to the radionuclide disintegration from unwanted background energy. In operation the coincident detector receives pulses from both photomultiplier tubes 10 and 12 and measures the time difference between the received pulses. If the second pulse is received within a predetermined length of time, or time differential window of the first, such an event is concluded to be related to the radioactive decay event. An enable signal is presented to the analog-to-digital converter 18 to simultaneously gate the combined pulse through to microprocessor 22. Of course, if a pulse is not received at each input of the coincidence detector within the time window, the analog-to-digital converter is not enabled so that no scintillation event is counted.

The digital number representing the counted nuclear event is received by microprocessor 22 and stored in memory 24 for subsequent use. Those skilled in the art will appreciate the aforegoing description as general in nature and could describe a number of different scintillation counting systems. A particular advantageous feature of the herein radionuclide identification method is that it is adapted for and well suited for implementation by existing scintillation counting systems. Thus a subroutine could be written and incorporated into the programming software of the microprocessor to implement a determination of the specific radionuclide using the quench-indicating parameters as described and the stored radionuclide equations. A subroutine of the nature described would merely implement the method steps as outlined in the appended claims. It is believed that the provision and implementation of such a subroutine would be within the knowledge of a person skilled in the art given the information as set forth in this application.

Figure 2:
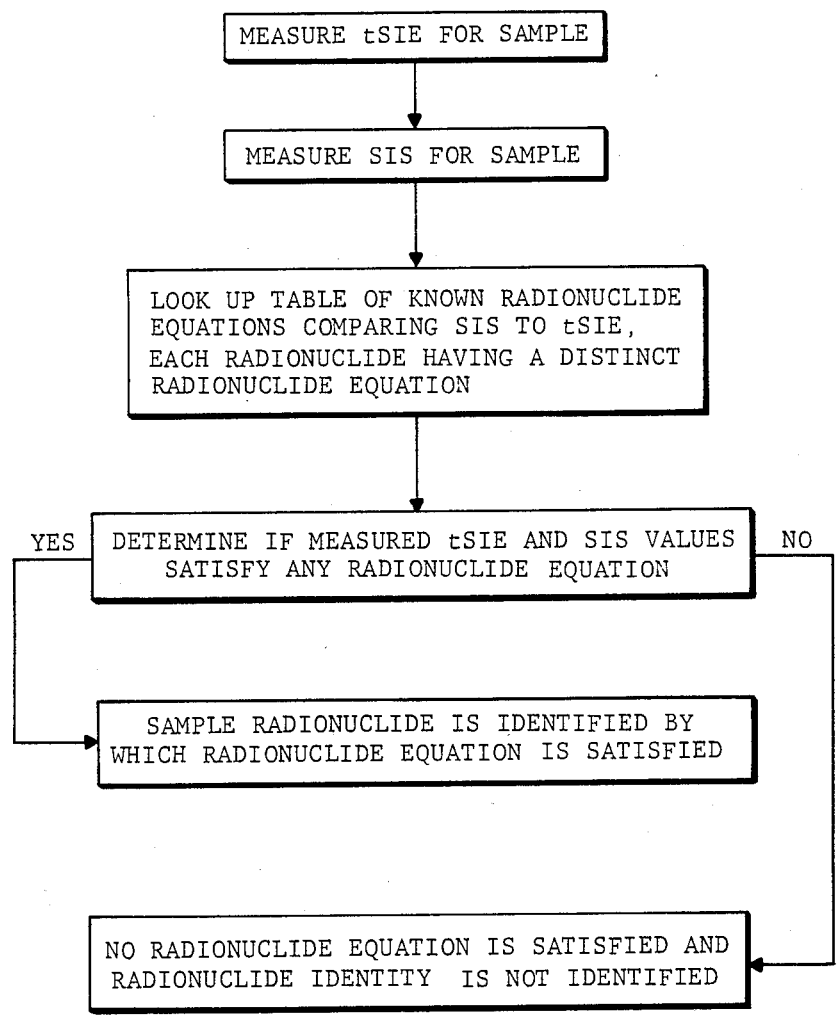
FIG. 2 is a flow chart of the method identifying which radionuclide is present in the test sample.

Referring now to FIG. 2, there may be seen a flow diagram of logic involved in making the necessary calculations to determine which radionuclide is present. It is understood that this flow diagram may be implemented either as a subroutine in the programming software of a microprocessor as shown in FIG. 3, or may be implemented in a peripheral computer in communication with the liquid scintillation counter. It is typically a choice of the user where the logic calculations are made.

Referring to the flow chart, it may be seen that the first step is to measure the transformed Spectral Index of the External Standard (tSIE) for the sample. The next step is to measure the Spectral Index of the Sample (SIS) for the sample. The logic then flows to a look-up table where known radionuclide equations comparing SIS to tSIE are stored for each radionuclide. The logic then flows to determine if the measured tSIE and SIS values satisfy any radionuclide equation from the look-up table. Typically, the measured SIS and tSIE values will be substituted sequentially into each equation in a trial and error method until it is determined that the measured values satisfy one of these equations. Since the identity of the radionuclide corresponding to each equation is known, if it is determined that the tSIE and SIS values statistically satisfy any specific radionuclide equation, then the answer is "Yes", and the logic flows to indicate that the sample radionuclide is identified by the specific radionuclide equation that is satisfied.

If, on the other hand, the step of determining if the measured tSIE and SIS values satisfy any radionuclide equation determines that there is no equation satisfied, then the logic flows to the step of indicating that no radionuclide equation is satisfied and radionuclide identity is not identified.

As otherwise set forth herein it is also to be understood that instead of the entire radionuclide equation, the slope of the correlation between tSIE and SIS for each radionuclide may be utilized. If such is the case, then it is necessary to determine the tSIE and SIS values for the sample at two different quench levels such that the slope therebetween may be measured. Then in like manner this measured slope is compared to the look-up table of known slopes for each radionuclide of interest.

It is to be understood that a certain amount of sample variation and processing variation is found in all measurements. Hence, if the measured values fall within a certain defined range about the radionuclide equation, then it is determined that a fit is present.

The invention has been described with reference to a particular embodiment. It is, however, to be understood that variations and modifications can be effected within the spirit and scope of the invention.

I claim:

1. A liquid scintillation counting system for use with a test sample containing a radioactive nuclide together with a liquid scintillator such that the identity of a radionuclide may be ascertained as a function of a quench-indicating parameter of the sample, an external source quench-indicating parameter, and known radionuclide equations which comprises:

transducer means for converting energy released by the decay of radionuclides into electrical pulses proportional thereto;

signal processing means connected to said transducer means for eliminating pulses which do not fall within a predetermined time differential window so as to screen out pulses which are not related to the decay of a radionuclide;

quantizing means connected to the signal processing means for converting each pulse into a representative digital signal; and processing means connected to receive digital signals from the quantizing means, said processing means including storage means for storing a single, predetermined radionuclide equation correlating a quench-indicating parameter of the sample and an external source quench-indicating parameter for each of a series of desired radionuclides and said processing means storing data representative of an external source quench-indicating parameter of the test sample and a quench-indicating parameter of the test sample, and said processing means including means to determine if the data representative of the external source quench-indicating parameter of the test sample and the quench-indicating parameter of the test sample satisfy any one of the stored radionuclide equations so as to indicate the presence of the radionuclide of the equation that is satisfied.

2. The apparatus as set forth in claim 1 wherein the processing means stores and processes the digital signals used to determine the external source quench-indicating parameter and the quench-indicating parameter without grouping the signals by energy regions.

3. The apparatus as set forth in claim 1 wherein the quench-indicating parameter is the Spectral Index of the Sample (SIS) and the external source quench-indicating parameter is the transformed Spectral Index of the External Standard (tSIE).

4. The apparatus as set forth in claim 3 wherein each radionuclide equation is near linear and is expressed in the form:

$$y = mx + b$$

where
   $y$ = SIS value;
   $m$ = slope of plot of SIS versus tSIE;
   $x$ = tSIE value; and
   $b$ = intercept on SIS axis of a plot of SIS versus tSIE.

5. The apparatus as set forth in claim 1 wherein the test sample contains multiple radionuclides, wherein the quench-indicating parameter is the measured end point maximum energy and wherein the processing means identifies the higher end point maximum energy radionuclide.

6. A method for ascertaining the radioactive nuclide in a test sample which comprises the steps of:

establishing a single radionuclide equation relating a quench-indicating parameter of the sample and an external source quench-indicating parameter for each of a series of radionuclides which might be identified in the sample;

determining a quench-indicating parameter for the test sample;

determining an external source quench-indicating parameter for the test sample;

comparing the quench-indicating parameter of the test sample and the external source quench-indicating parameter to each of the established radionuclide equations; and identifying a radioactive nuclide in the test sample by identifying which radionuclide equation is satisfied by the quench-indicating parameter of the test sample and the external source quench-indicating parameter of the test sample, so as to identify that the radioactive nuclide represented by the satisfied radionuclide equation is a radioactive nuclide present in the test sample.

7. The method as set forth in claim 6 wherein the step of establishing includes the quench-indicating parameter being the Spectral Index of Sample (SIS) and the external source quench-indicating parameter being the transformed Spectral Index of the External Standard (tSIE).

8. The method as set forth in claim 6 whrein the test sample contains multiple radionuclides wherein the quench-indicating parameter is the measured end point maximum energy, and wherein the step of identifying includes identifying the radionuclide with the highest end point maximum energy.

9. The method as set forth in claim 7 wherein the step of establishing includes the radionuclide equations being of the form:

$$y = mx + b$$

where
   $y$ = SIS value;
   $m$ = slope of plot of SIS versus tSIE;
   $x$ = tSIE value;
   $b$ = intercept on SIS axis of plot of SIS versus tSIE; and
   the step of comparing includes substituting the SIS and tSIE values from the test sample into each radionuclide equation to determine if the measured values satisfy one of said equations.

10. A liquid scintillation counting system for use with a test sample containing a radioactive nuclide together with a liquid scintillator such that the identity of a radionuclide may be ascertained as a function of a quench-indicating parameter of the sample, an external source quench-indicating parameter, and known radionuclide slopes of correlation between the two quench-indicating parameters for selected radionuclides which comprises:

transducer means of converting energy released by the decay of radionuclides into electrical pulses proportional thereto;

signal processing means connected to said transducer means for eliminating pulses which do not fall within a predetermined time differential window so as to screen out pulses which are not related to the decay of a radionuclide;

quantizing means connected to the signal processing means for converting each pulse into a representative digital signal; and processing means connected to receive digital signals from the quantizing means, said processing means including storage means for storing a single predetermined radionuclide slope correlating a quench-indicating parameter of the sample and an external source quench-indicating parameter for each of a series of radionuclides of interest and said processing means storing data representative of an external source quench-indicating parameter of the test sample and a quench-indicating parameter of the test sample taken with the sample at multiple quench levels, said processing means determining the slope of the correlation between the quench-indicating parameter and the external source quench-indicating parameter from the test sample and said processing means including means to compare the test sample slope to each of the stored radionuclide slopes to determine if the test slope matches any one of the stored slopes, and if such match exists identifying the specific radionuclide having that slope.

* * * * *